United States Patent [19]

Yamakawa et al.

[11] Patent Number: 4,586,583
[45] Date of Patent: May 6, 1986

[54] SYSTEM FOR CONTROLLING A POWER TRANSMISSION OF A FOUR-WHEEL DRIVE VEHICLE

[75] Inventors: Toru Yamakawa; Fujio Makita, both of Hachioji; Mitsuo Umezawa; Ryuzo Sakakiyama, both of Tokyo, all of Japan

[73] Assignee: Fuji Jukogyo Kabushiki Kaisha, Tokyo, Japan

[21] Appl. No.: 651,545

[22] Filed: Sep. 17, 1984

[30] Foreign Application Priority Data

Sep. 19, 1983 [JP] Japan ................................ 58-172667

[51] Int. Cl.⁴ ............................................ B60K 23/08
[52] U.S. Cl. .................................................. 180/247
[58] Field of Search ....................... 180/233, 247, 197

[56] References Cited

U.S. PATENT DOCUMENTS 4,466,502  8/1984  Saki ..................................... 180/247

FOREIGN PATENT DOCUMENTS 58-56919  4/1983  Japan ................................... 180/247
58-56920  4/1983  Japan ................................... 180/247
58-71221  4/1983  Japan ................................... 180/247

Primary Examiner—Richard E. Gluck
Attorney, Agent, or Firm—Martin A. Farber

[57] ABSTRACT

A system for controlling a power transmission of a four-wheel drive vehicle powered by an engine has a transmission for transmitting the power of the engine to main driving wheels of the four-wheel drive vehicle, and a clutch for transmitting the power to auxiliary driving wheels. A hydraulic circuit and a solenoid operated valve are provided for operating the clutch.

First sensors are provided for detecting the speed of the main and auxiliary driving wheels, respectively, and second sensors are provided for detecting depression of an accelerator pedal and depression of a brake pedal of the vehicle respectively. When a large difference between the speed of the wheels is detected, the clutch is engaged, and when a large acceleration and large deceleration dependent on the output of the first sensors are detected, the clutch is engaged for establishing the four-wheel drive.

3 Claims, 6 Drawing Figures

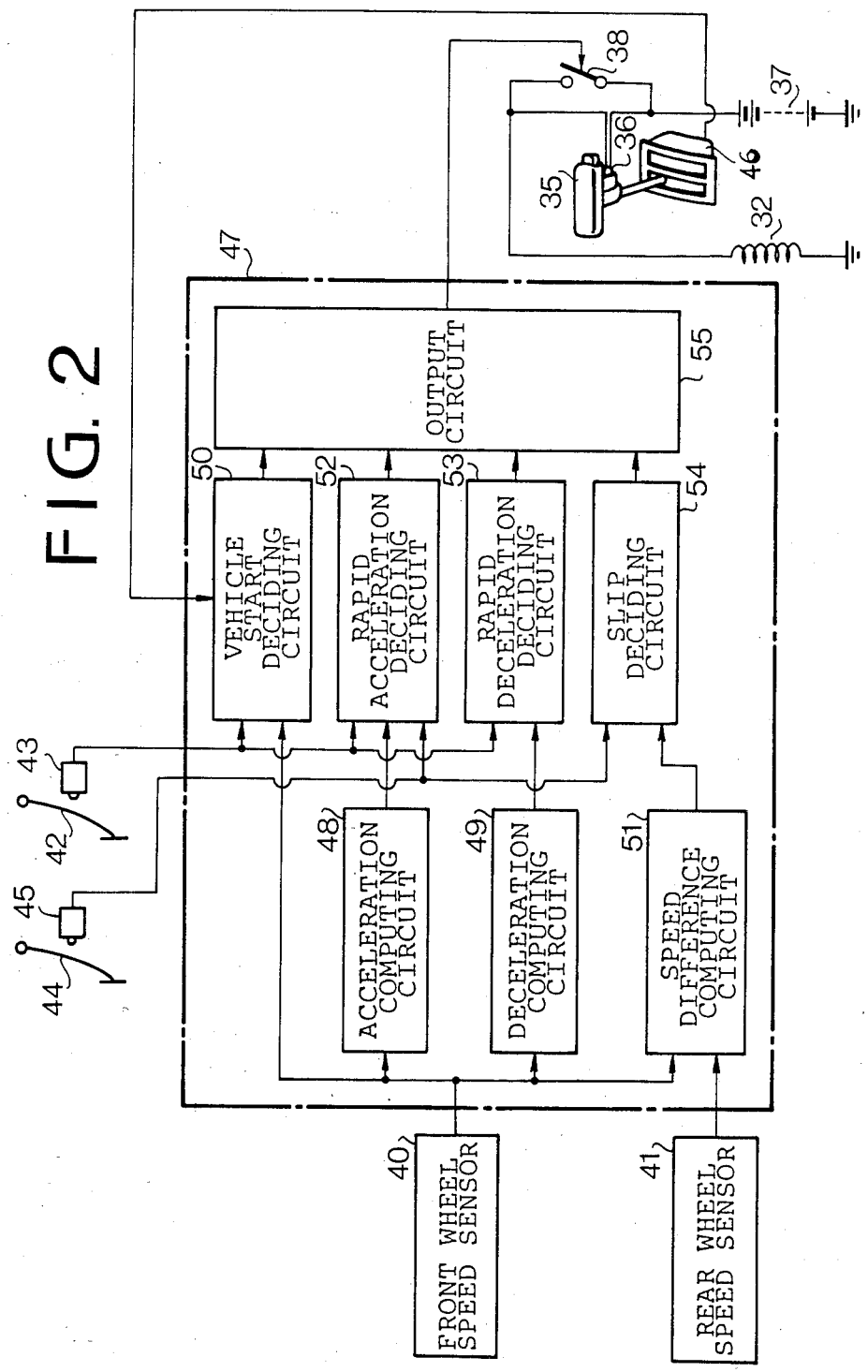

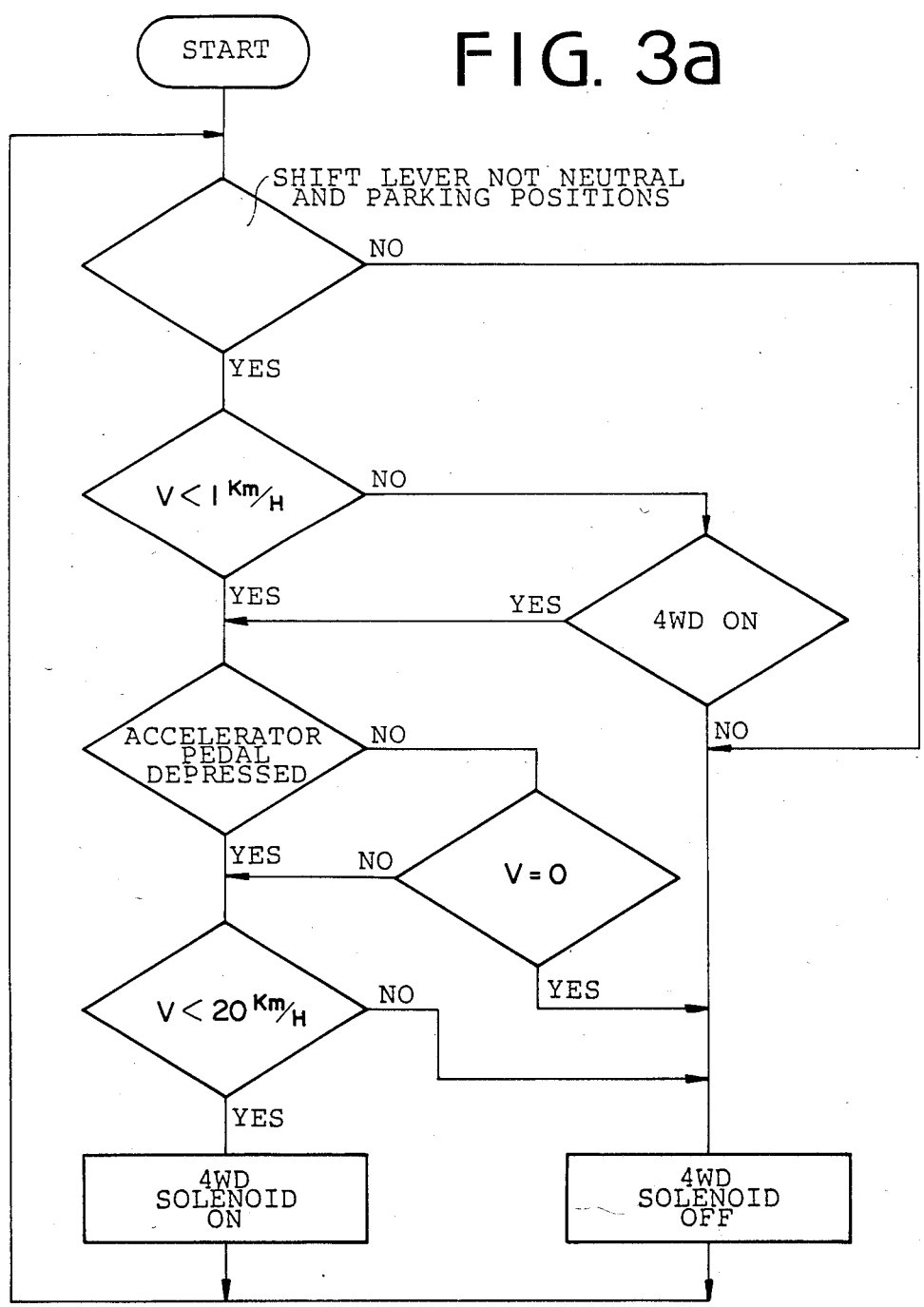

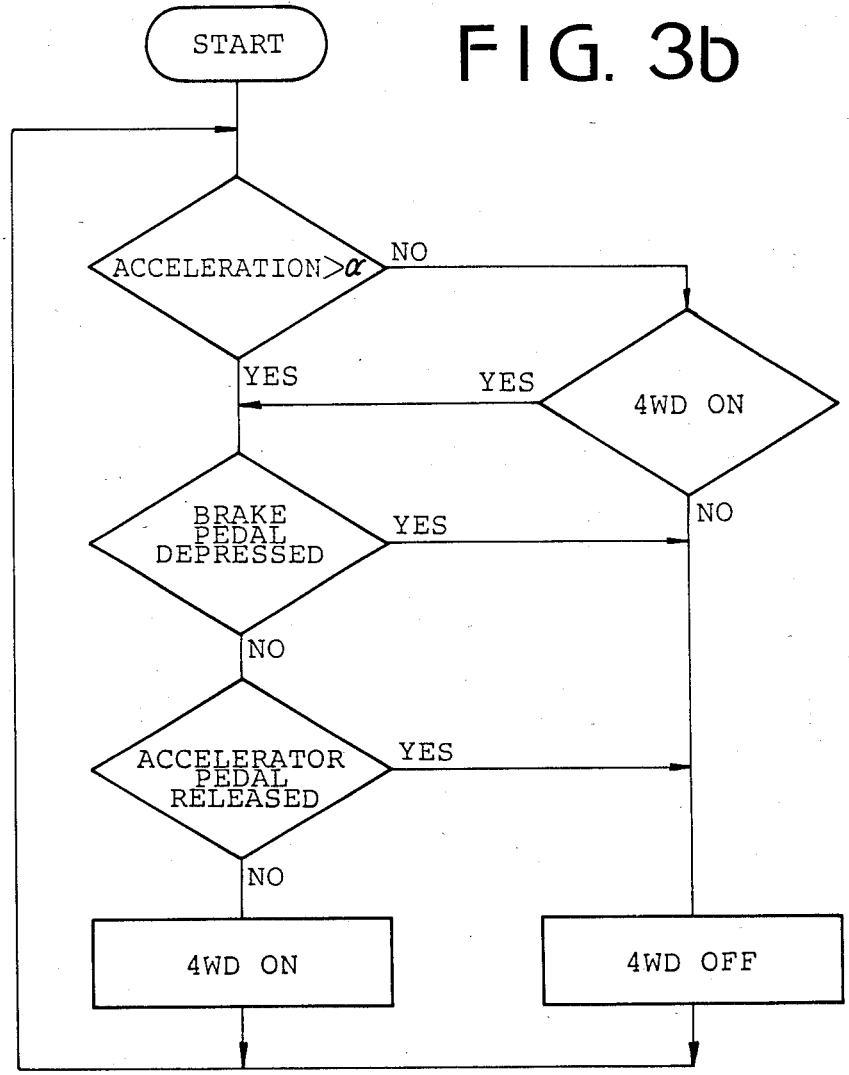

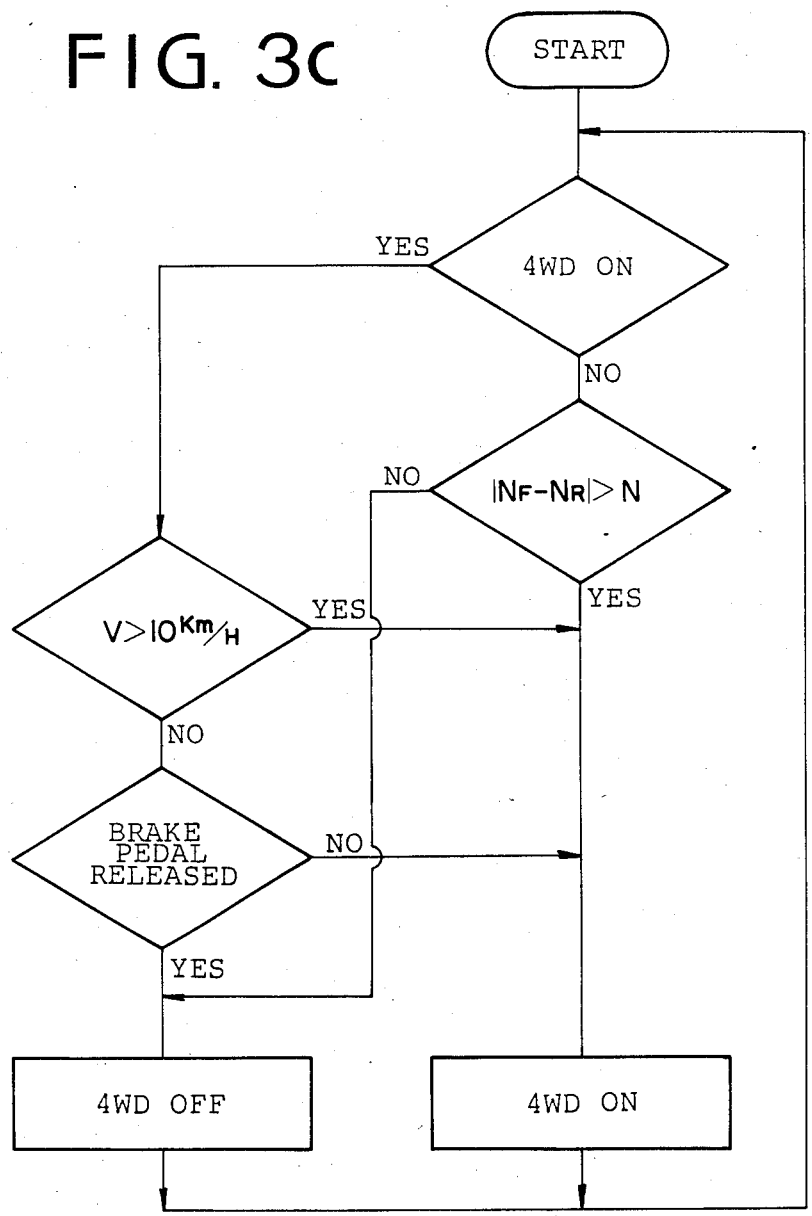

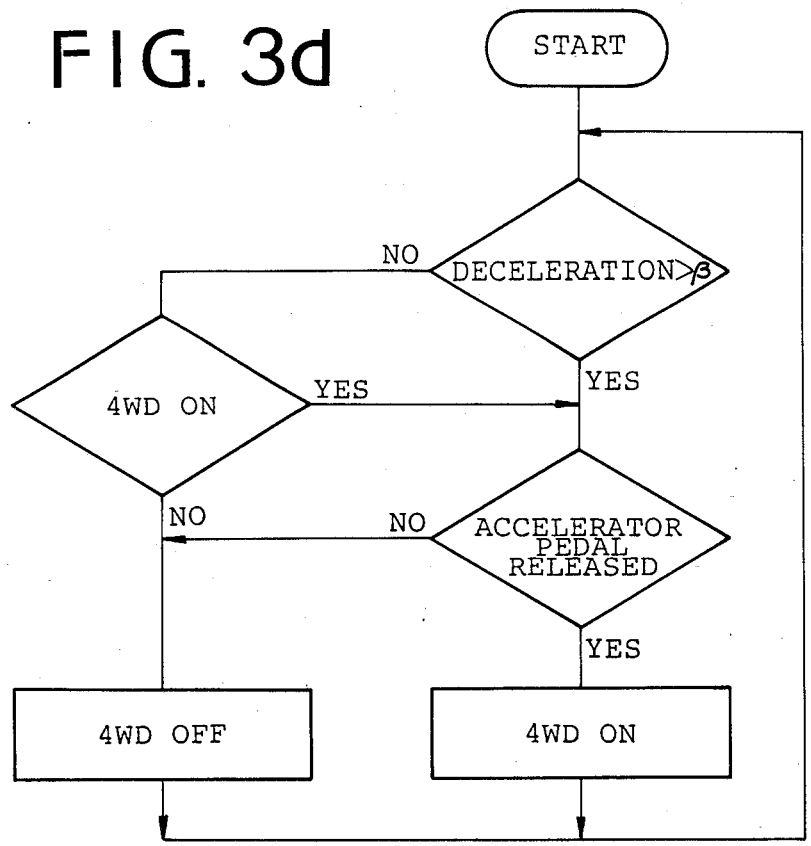

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from two-wheel drive to four-wheel drive in accordance with driving conditions.

In a conventional four-wheel drive vehicle disclosed in Japanese laid open 55-4292, a power transmission system for the two-wheel driving is selectively converted to four-wheel driving by engaging a clutch which is manually operated by a select lever.

For example, when the vehicle travels on slippery roads by two-wheel driving, the transmission system should be changed to the four-wheel drive system in order to prevent the wheels from slipping. If the changing operation is done after the slipping occurs because of the driver's misjudgement of the slipping, the slipping cannot be stopped or reduced.

On the other hand, four-wheel driving under steady driving conditions causes noise. To resolve such unfavorable problems, an automatic control system for the four-wheel drive system has been proposed. A conventional system is provided with a slip detecting circuit which produces a clutch signal when the difference between the speed of the front and rear wheels exceeds a predetermined reference value. The clutch signal causes a clutch to engage, so that the two-wheel drive is automatically changed to the four-wheel drive.

However, the four-wheel driving is useful to drive the vehicle under conditions other than driving on slippery roads. For example, during rapid starting or rapid acceleration, four-wheel driving is effective for preventing slipping which occurs according to driving conditions. Further, during rapid deceleration, four-whel driving is useful to prevent the slipping of the non-driving wheels. In addition, since the engine braking acts on all the wheels, the vehicle is effectively and safely braked.

SUMMARY OF THE INVENTION

Therefore, the object of the present invention is to provide a power transmission control system which operates to automatically change the two-wheel driving to the four-wheel driving in accordance with various driving conditions.

According to the present invention, there is provided a system for controlling a power transmission of a four-wheel drive vehicle powered by an engine having a transmission for transmitting the power of said engine to main driving wheels of said four-wheel drive vehicle, a clutch for transmitting said power to auxiliary driving wheels, circuit means for operating said clutch in accordance with driving conditions. The system comprises first sensors for detecting speeds of said main and auxiliary driving wheels; a second sensor for detecting depression of an accelerator pedal of said vehicle; a third sensor for detecting depression of a brake pedal of said vehicle; a fourth sensor for detecting position of a shift lever of said transmission; first means responsive to a large difference between said speeds of the wheels for engaging said clutch; and second means responsive to large acceleration and/or large deceleration dependent on the output of said first sensors for engaging said clutch.

In an aspect of the present invention, the clutch is a hydraulically operated clutch, and the circuit means comprises a hydraulic circuit for operating the clutch. The hydraulic circuit has a solenoid operated valve for controlling a fluid supplied to the clutch, and the first and second means comprise an electric circuit responsive to outputs of the sensors.

The other objects and features of this invention will be apparently understood from the following description with reference to the accompanying drawings.

BRIEF DESCRIPTION OF DRAWINGS

FIG. 2 is a diagram showing an electric circuit provided in the system of the present invention; and FIGS. 3(a) to 3(d) are flow charts.

DETAILED DESCRIPTION OF THE PREFERRED EMBODIMENTS

Figure 1:
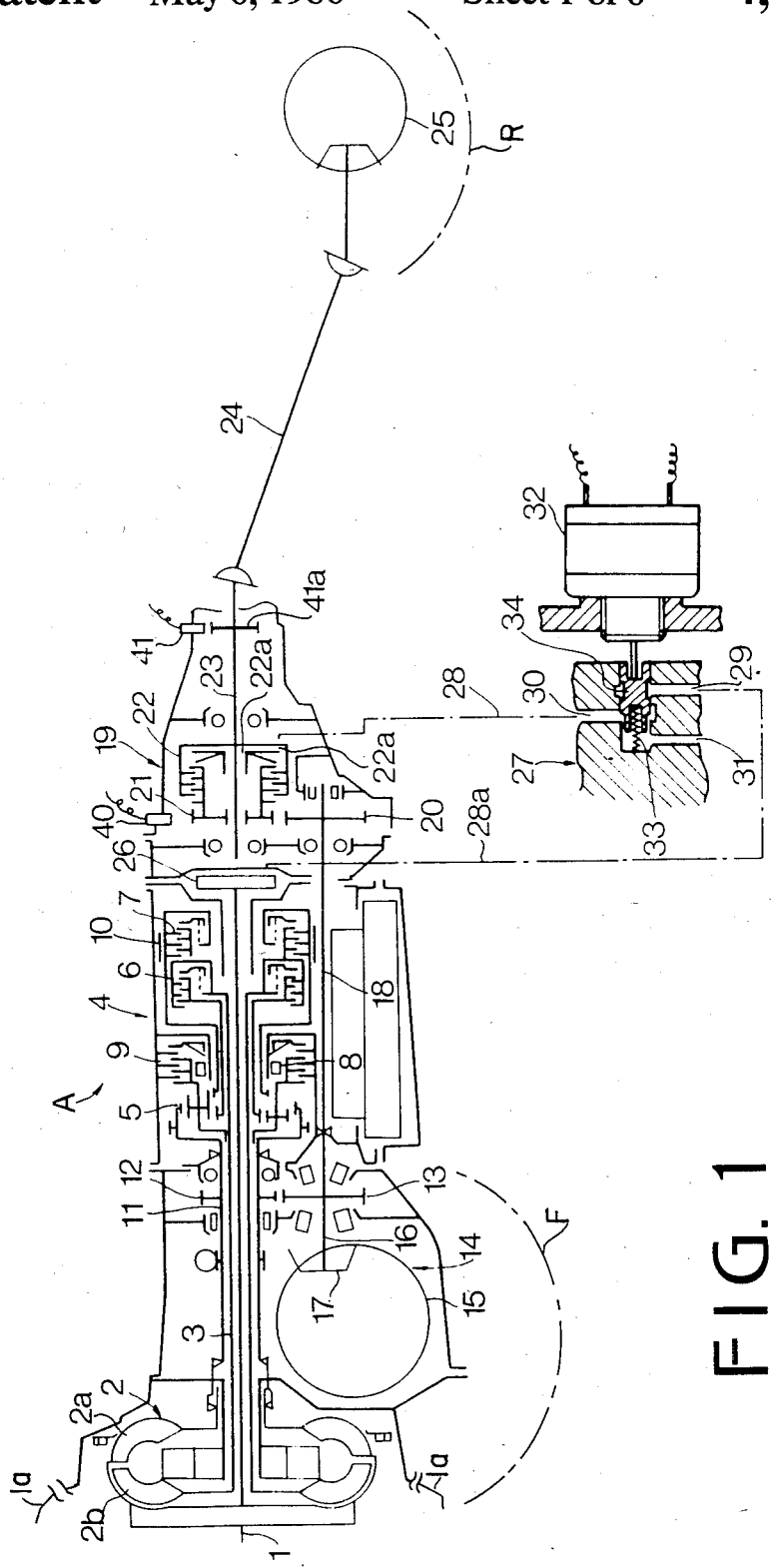
FIG. 1 is a schematic view showing an automatic transmission to which a control system according to the present invention is used.

Referring to FIG. 1, a crankshaft 1 of an internal combustion engine (1a) mounted on a front portion of a vehicle is operatively connected with a torque converter 2 of an automatic transmission A.

The automatic transmission A comprises the torque converter 2, an automatic transmission device 4, and a final reduction device 14 for front wheels F.

The torque converter 2 comprises a pump impeller 2a and a turbine 2b. The pump impeller 2a is connected with the engine crankshaft 1. A turbine shaft 3 is extended from the turbine 2b to the automatic transmission device 4.

The automatic transmission device 4 comprises a planetary gear 5, clutches 6 and 7 for selectively transmitting the output of the turbine shaft 3 to the planetary gear 5, a one-way clutch 8, a brake 9 and brake band 10 for selectively locking elements of the planetary gear 5.

The output of the automatic transmission device is transmitted to an output shaft 11 on which a drive gear 12 is securely mounted and which in turn engages with a driven gear 13. The driven gear 13 is securely mounted on a shaft 16, on one end of which a drive pinion 17 is formed. The drive pinion 17 engages with a crown gear 15 of the final reduction device 14 for the front wheels F. The other end of the shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A pressure oil operated friction clutch 22 of the type of multiple-disk is mounted on the rear drive shaft 23 for engaging the gear 21 with the shaft 23. The rear drive shaft 23 is further operatively connected to a final reduction device 25 for rear wheels R through a propeller shaft 24.

A pressure chamber 22a of the clutch 22 is communicated with an oil pump 26 through a passage 28, solenoid-operated changeover valve 27 and passage 28a. The changeover valve 27 has an inlet port 29 connected to the oil pump 26, an outlet port 30 connected to the pressure chamber 22a, and a drain port 31.

A spool 34 is operatively connected to a solenoid 32 and biased by a spring 33 to the right. When the solenoid 32 is de-energized, the spool 34 is urged by the spring 33 to close the inlet port 29 and to communicate the outlet port 30 with the drain port 31 as shown in FIG. 1. By draining the pressure chamber 22a, the clutch 22 disengages. When the solenoid 32 is energized, the spool 34 is shifted to the left to close the drain port 31 and to communicate the pressure chamber 22a with the oil pump 26 through the passage 28, ports 30, 29 and passage 28a. Thus, the clutch 22 engages, thereby to connecting the gear 21 with the shaft 23 to establish a four-wheel drive power transmission.

Referring to FIG. 2, a manual switch 36 is mounted on a select lever 35 of the automatic transmission device 4 and electrically connected between the solenoid 32 and a battery 37 in series. Further, an electrically operated switch 38 is connected to the manual switch 36 in parallel. Thus, the solenoid 32 is energized by closing the switch 36 or 38 to establish the four-wheel drive.

In order to sense speeds of front and rear wheels, a front wheel speed sensor 40 is provided adjacent to the second transfer gear 21 (FIG. 1), and a rear wheel speed sensor 41 is provided adjacent to a gear 41a mounted on the rear drive shaft 23. Further an acceleration switch 43 is provided to be operated by the depression of an accelerator pedal 42, and a brake switch 45 is provided to be operated by a brake pedal 44. An inhibitor switch 46 is provided the lower portion of the select lever 35 so as to be operated at the neutral position and parking position of the shift lever. Speed sensors 40 and 42 produce output pulses dependent on speed. The outputs of these sensors and switches are fed to a control unit 47 which produces an output signal to operate the switch 38, as described hereinafter.

The control unit 47 has an acceleration computing circuit 48 and a deceleration computing circuit 49 which are applied with the output of the front wheel speed sensor 40 to produce an output in dependency on the variation of the speed of the front wheels, and has a vehicle start detecting circuit 50 responsive to outputs of the front wheel speed sensor 40, acceleration switch 43 and inhibitor switch 46. The control unit 47 further comprises a speed difference computing circuit 51 for computing the difference between the speed of the front and rear wheels, a rapid acceleration deciding circuit 52 responsive to the outputs of acceleration switch 43, acceleration computing circuit 48 and brake switch 45, a rapid deceleration deciding circuit 53 responsive to the outputs of the acceleration switch 43 and deceleration computing circuit 49, and a slip deciding circuit 54 responsive to the outputs of brake switch 45 and the speed difference computing circuit 51. The outputs of those circuits 50, 52, 53 and 54 are applied to the switch 38 through an output circuit 55 to close it.

Describing the operation of the system with reference to FIGS. 3(a)-3(d), FIG. 3(a) is a flow chart for the starting of the vehicle, FIG. 3(b) is for acceleration, 3(c) is steady state, and 3(d) is deceleration. At the starting of the vehicle, neutral position or parking position and vehicle speed are detected, and further, depression of the accelerator pedal is detected, so that the four-wheel drive (4WD) solenoid 32 is energized to provide the four-wheel drive transmission. When the vehicle speed reaches a predetermined value or the vehicle is stopped, the 4WD is released. When acceleration is higher than a predetermined value $\alpha$, 4WD is set. When the accelerator pedal is released or the brake pedal is depressed, the 4WD is reset. At steady driving state (FIG. 3(c)), when the difference $|NF-NR|$ between the speed of the front and rear wheels is larger than a predetermined value N, which means slipping of wheels, 4WD is set. When the vehicle speed becomes low and the brake pedal is released, 4WD is reset. At deceleration (FIG. 3(d)), when the deceleration exceeds a predetermined value $\beta$, 4WD is set. When the accelerator pedal is depressed the 4WD is reset.

From the foregoing, it will be understood that the present invention provides a control system for a four-wheel drive vehicle which ensures safety driving of the vehicle, and improves driveability and fuel consumption.

While the presently preferred embodiment of the present invention has been shown and described, it is to be understood that this disclosure is for the purpose of ilustration and that various changes and modifications may be made without departing from the spirit and scope of the invention as set forth in the appended claims.

What is claimed is:

1. An improved system for controlling a power transmission of a four-wheel drive vehicle powered by an engine having a transmission for transmitting the power of said engine to main driving wheels of said four-wheel drive vehicle, a clutch for transmitting said power to auxiliary driving wheels, circuit means for operating said clutch in accordance with driving conditions, wherein the improvement comprises:

first sensors for detecting speeds of said main and auxiliary driving wheels;

a second sensor for detecting depression of an accelerator pedal of said vehicle;

a third sensor for detecting depression of a brake pedal of said vehicle;

a fourth sensor for detecting a neutral position and a parking position of a shift lever of said transmission;

first means responsive to a large difference between said speeds of the wheels for engaging said clutch;

second means responsive to large acceleration and large deceleration dependent on the output of said first sensors for engaging said clutch respectively.

2. The system according to claim 1 wherein said clutch is a hydraulically operated clutch, and said circuit means includes a hydraulic circuit for operating said clutch.

3. The system according to claim 2 wherein said hydraulic circuit having a solenoid operated valve for controlling a fluid supplied to said clutch, and said first and second means comprise an electric circuit responsive to outputs of said sensors.

* * * * *